UNITED STATES PATENT OFFICE.

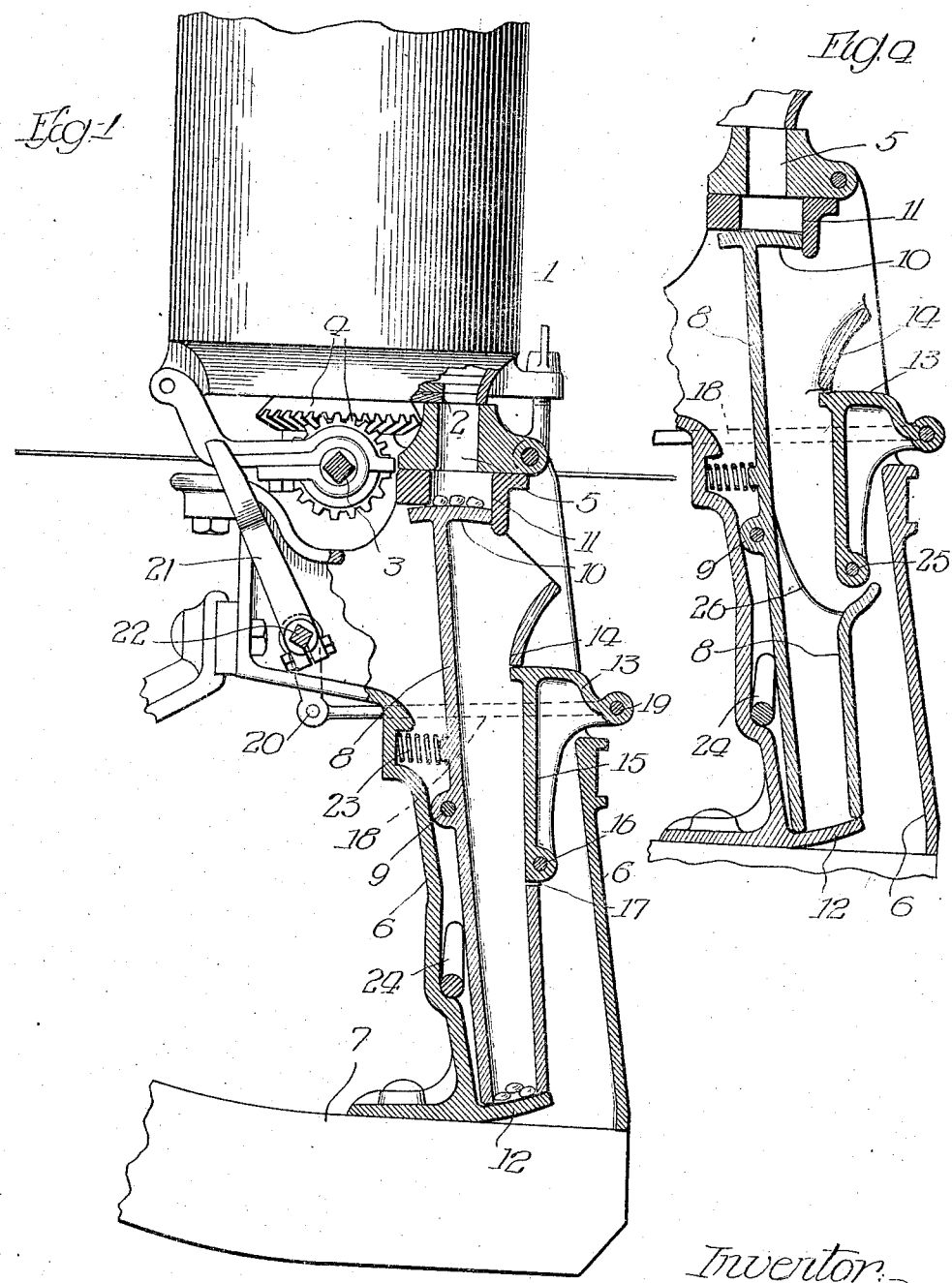

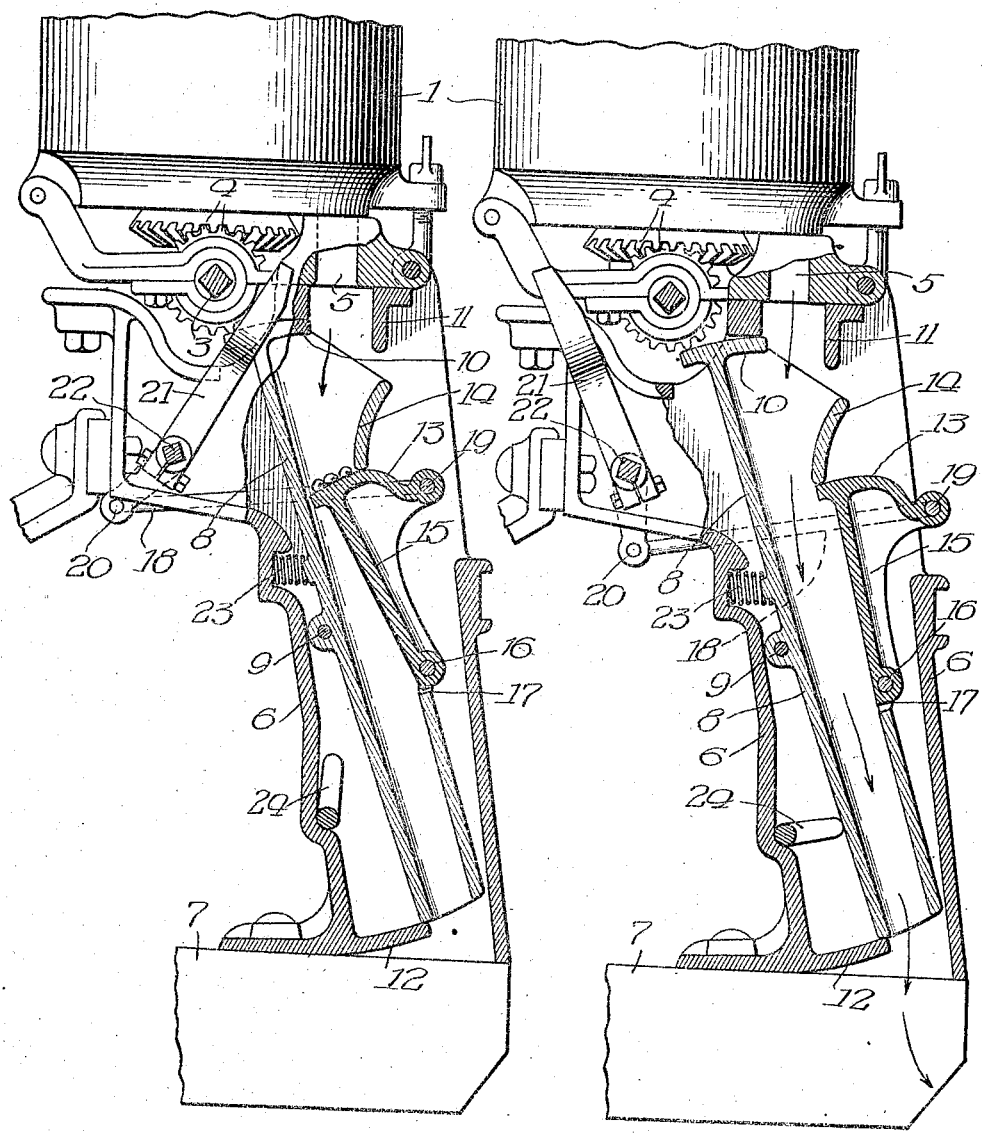

ALVARO S. KROTZ, OF JANESVILLE, WISCONSIN, ASSIGNOR TO JANESVILLE MACHINE COMPANY, OF JANESVILLE, WISCONSIN, A CORPORATION OF WISCONSIN.

PLANTER VALVE MECHANISM.

1,306,153. Specification of Letters Patent. Patented June 10, 1919.

Application filed October 15, 1918. Serial No. 258,198.

*To all whom it may concern:*

Be it known that I, ALVARO S. KROTZ, a citizen of the United States of America, and a resident of Janesville, Wisconsin, have invented a certain new and useful Improvement in Planter Valve Mechanism, of which the following is a specification.

This invention relates to planting machines of that kind in which the seed, such as corn, is carried in the box or hopper provided with dropping mechanism at the upper end of a so called boot which has a runner at its lower end, and within which boot valve mechanism is provided for the purpose of controlling the dropping of the corn or other seed into the groove formed in the ground by the runner.

The object of the invention, generally stated, is to provide a novel and improved valve mechanism within the boot, adapted to be controlled by the check-row mechanism of the planter, and constructed to operate in a novel and reliable manner, and intended to more satisfactorily control the dropping of the corn or other seed than was found to be the case with certain other devices employed for this purpose.

It is also an object to provide certain details and features of construction tending to increase the general efficiency and serviceability of a seed-dropping valve mechanism of this particular character and mode of operation.

To these and other useful ends the invention consists in matters hereinafter set forth and claimed.

In the accompanying drawings—

Figure 1 is a vertical section of a planter boot, showing the seed-dropping mechanism at the top thereof, and a portion of the runner below, and showing one quantity of seed at the upper end of the boot, and another quantity at the lower end thereof, the different parts of the valve mechanism being shown in the boxes which they occupy each time two quantities of seed are thus momentarily held in these boxes.

Fig. 2 is a similar view, but showing the different parts of the valve mechanism in the boxes which they occupy just after the lower quantity of seed has been discharged into the ground, and just after the upper quantity of seed has been allowed to fall from the upper valve to the intermediate valve.

Fig. 3 is a similar view showing the boxes which the parts of the valve mechanism occupy when the planter is used for drilling.

Fig. 4 shows another form of the invention.

As thus illustrated, the seed-dropping mechanism comprises the usual or any suitable hopper or seed box 1 provided with any ordinary seed-dropping mechanism 2 in the bottom thereof, this mechanism being operated from the shaft 3 through the bevel gearing 4 in the usual and well known manner. The seed-dropping mechanism discharges the seed, such as corn, through the opening 5 into the upper end of the boot 6, which latter is of any suitable or ordinary form, provided at its lower end with the usual runner 7 which cuts the furrow in the ground to receive the seed. Within the boot a tube 8 is pivoted between its upper and lower ends at 9, so that it oscillates about a horizontal and transverse axis. The upper end of the tube is provided with a ledge 10 which coöperates with the upper end portion 11 of the boot to form the upper valve. The lower end of the boot has a ledge 12 which coöperates with the lower end portion of the tube to form the lower valve, both valves being closed when the tube is in the position shown in Fig. 1, and both valves being open when the tube is in the position shown in Fig. 2 or in the position shown in Fig. 3, in a manner that will be readily understood. An intermediate valve 13 coöperates with the portion 14 of the tube to form a third valve, this valve moving into and out of the tube to control a communication between the upper and lower valves. Said intermediate valve 13 is provided with a downwardly extending arm 15 which is pivoted at 16 upon the tube, so that said intermediate valve swings about a horizontal and transverse axis which is parallel with the axis provided by the pivot 9, but spaced a distance therefrom, whereby the pivot 16 and the axis formed thereby will rise and fall or swing about the axis formed by the pivot 9, when the tube 8 is rocked or oscillated on the pivot 9, the pivot 16 being suitably mounted on the back or rear side of the tube, and the latter having a slot 17 which is occupied by the intermediate valve 13 and its arm 15, so that this valve may swing into and out of the tube. For the purpose of positively opening and closing the valve 13, and as a means for positively opening the upper and lower valves formed in part by the ledges 10 and 12, a rod 18 is pivoted on the valve 13 at 19, and has its other end pivoted at 20 upon the lower end of the check-row arm 21, which latter is of any suitable or ordinary form and is mounted in the usual manner upon the oscillating or check-row shaft 22 with which check-row planters of this general character are usually provided. A spring 23 is interposed between the front side of the tube 8 and the adjacent portion of the boot 6, immediately above the pivot 9, so that oscillation or movement of the tube in one direction will be yieldingly opposed by said spring.

When a knot in the check-row wire strikes the check-row arm or fork 21, the valve 13 is immediately pulled forward to close the tube 8 at this point, and as soon as the inner edge of the valve 13 strikes the front wall of the tube, thereby limiting the closing movement of this valve, the tube will then oscillate or rock about its pivot 9 against the yielding pressure of the spring 22, and this will open the upper and lower valves, as shown in Fig. 2, thereby allowing the upper quantity of seed which was resting on the ledge 10 to fall upon the intermediate valve 13, and causing the lower quantity of seed which was resting on the ledge 12 to be scraped or wiped off from this ledge by the lower end of the tube, so that this lower quantity of seed will be discharged into the ground at the same time that the upper quantity is permitted to fall upon the intermediate valve. Then the reverse movement of the check-row arm or fork 21 will permit the tube 8 to swing back into the position shown in Fig. 1, so that the ledge 10 will receive the next discharge from the seed-dropping mechanism, and so that the lower valve will also be closed; and the movement of the check-row arm or fork continuing, after the tube 8 stops moving, the valve 13 will then continue moving until it occupies the position shown in Fig. 1, thus discharging its quantity of seed into the lower position of the tube 8 and upon the ledge 12, whereby the valve mechanism is again in condition to be operated by the check-row mechanism to discharge another quantity of seed into the ground.

As shown in Fig. 3, the cam or locking device 24 has been moved into position to retain the tube 8 in position for drilling, the intermediate valve 13 being retained open at such time. Thus the seed dropped from the mechanism at the upper end of the boot will fall constantly through the tube and from the lower end thereof into the groove or small trench cut by the runner. From the foregoing, therefore, it will be seen that the valve mechanism is adapted for either check-row planting, so that the corn or the seed will be planted in hills, or for a method ordinarily known as drilling, which latter consists, as is well known, in simply dropping the corn or other seed continuously into the groove cut by the runner.

As shown in Fig. 4, the construction is similar to that previously described, but in this case the valve 15 is not pivoted on the movable tube, but to the contrary, is pivoted at 25 on the boot of the planter. Also, the tube 8 is cut away at its upper portion along the line 26, and the portion 14 is rigid with the upper portion of the boot. However, when the rod 18 is pulled forward, the valve 15 closes before it strikes the front wall of the tube 8, and thus the intermediate valve is closed before the upper and lower valves open; and vice versa, as in the construction previously described, the intermediate valve must then open before the upper and lower valves can close.

What I claim as my invention is:—

1. In a planter having a boot for connecting the seed-dropping mechanism above with the runner below, a valve at the upper end of said boot, a valve at the lower end thereof, the two valves having their movable elements rigidly connected together, to operate in unison, an intermediate valve, and operating devices connected to the intermediate valve to control all three valves, thereby to close said intermediate valve before the upper and lower valves are opened, and to close the upper and lower valves before the intermediate valve is opened.

2. A structure as specified in claim 1, the upper and lower valves comprising a tube, a pivot for said tube, the tube having a ledge forming part of the upper valve, the boot having a ledge and a pivot for the intermediate valve, one pivot being spaced a distance from the other.

3. A structure as specified in claims 1 and 2, the pivot for the intermediate valve being on the back of the tube, and the pivot of the tube being at the front thereof, whereby the valve pivot swings about the tube pivot, and a spring for returning the tube to the position for closing the upper and lower valves, said devices comprising a rod connected to the intermediate valve above the pivot thereof.

4. A structure as specified in claim 1, said upper and lower valves being formed in part by a pivoted tube, and a spring applied to said tube for simultaneously closing the two valves.

5. In a planter, a boot having an upper valve and a lower valve, said valves being formed in part by a pivoted tube, devices including an intermediate valve to actuate the tube in one direction to open said upper and lower valves, and a spring applied to the tube to close said upper and lower valves.

6. A structure as specified in claim 5, said devices including an intermediate valve movably mounted on said tube.

7. In a planter having a boot for connecting the seed-dropping mechanism above with the runner below, the combination of an upper valve, a lower valve, an intermediate valve, and controlling mechanism whereby the intermediate valve must close before the upper and lower valves can open, and whereby said intermediate valve must open before the upper and lower valves can close, said upper and lower valves being adapted to open and close simultaneously under the control of said mechanism.

8. A structure as specified in claim 7, said upper valve comprising a movable ledge, said lower valve comprising a stationary ledge, stationary means to wipe the seed off the upper ledge, movable means to wipe the seed off the lower ledge, the upper ledge and said movable means being rigidly connected together, said intermediate valve comprising a member pivoted to swing into and out of the path of the seed, having means to wipe the seed off said intermediate valve member, means engaged by said intermediate valve to cause the opening of said upper and lower valves, and a spring for closing said upper and lower valves.

9. In a planter having a boot for connecting the seed-dropping mechanism above with the runner below, a valve at the upper end of said boot, a valve at the lower end thereof, an intermediate valve, and operating devices connected to the intermediate valve to control all three valves, the upper and lower valves comprising a tube, a pivot for said tube, the tube having a ledge forming a part of the upper valve, the boot having a ledge and a pivot for the intermediate valve, one pivot being spaced a distance from the other.

10. In a planter having a boot for connecting the seed-dropping mechanism above with the runner below, a valve at the upper end of said boot, a valve at the lower end thereof, an intermediate valve, and operating devices connected to the intermediate valve to control all three valves, the pivot for the intermediate valve being on the back of the tube, and the pivot of the tube being at the front thereof, whereby the valve pivot swings about the tube pivot, and a spring for returning the tube to the position for closing the upper and lower valves, said devices comprising a rod connected to the intermediate valve above the pivot thereof.

11. In a planter having a boot for connecting the seed-dropping mechanism above with the runner below, a valve at the upper end of said boot, a valve at the lower end thereof, an intermediate valve, and operating devices connected to the intermediate valve to control all three valves, said upper and lower valves being formed in part by a pivoted tube, and a spring applied to said tube for simultaneously closing the two valves.

ALVARO S. KROTZ.

Copies of this patent may be obtained for five cents each, by addressing the "Commissioner of Patents, Washington, D. C."